US012511406B2

(12) United States Patent
Luo

(10) Patent No.: US 12,511,406 B2
(45) Date of Patent: Dec. 30, 2025

(54) DATA PROCESSING METHOD AND APPARATUS, ELECTRONIC DEVICE, AND MEDIUM

(71) Applicant: Tencent Cloud Computing (Beijing) Co., Ltd, Beijing (CN)

(72) Inventor: Ping Luo, Beijing (CN)

(73) Assignee: TENCENT CLOUD COMPUTING (BEIJING) CO., LTD., Beijing (CN)

( * ) Notice: Subject to any disclaimer, the term of this patent is extended or adjusted under 35 U.S.C. 154(b) by 238 days.

(21) Appl. No.: 18/132,126

(22) Filed: Apr. 7, 2023

(65) Prior Publication Data

US 2023/0244797 A1 Aug. 3, 2023

Related U.S. Application Data

(63) Continuation of application No. PCT/CN2021/106606, filed on Jul. 15, 2021.

(30) Foreign Application Priority Data

Jun. 3, 2021 (CN) .......................... 202110621841.4

(51) Int. Cl.
*G06F 21/60* (2013.01)
*G06F 21/31* (2013.01)
(Continued)

(52) U.S. Cl.
CPC .......... *G06F 21/602* (2013.01); *H04L 9/0869* (2013.01)

(58) Field of Classification Search
CPC ........ G06F 21/602; G06F 21/60; G06F 21/10; G06F 2221/2107; H04L 9/0869
See application file for complete search history.

(56) References Cited

U.S. PATENT DOCUMENTS 8,418,231 B2 * 4/2013 Denny .................... H04L 63/08
726/4
9,723,000 B1 * 8/2017 Daniel ................ G06F 21/6218
(Continued)

FOREIGN PATENT DOCUMENTS

CN 101771699 A 7/2010
CN 102088491 A 6/2011
(Continued)

OTHER PUBLICATIONS

Ethelbert et al., "A JSON Token-Based Authentication and Access Management Schema for Cloud SaaS Applications," 2017 IEEE 5th International Conference on Future Internet of Things and Cloud (FiCloud) Year: 2017 | Conference Paper | Publisher: IEEE.*
(Continued)

*Primary Examiner* — Roderick Tolentino
(74) *Attorney, Agent, or Firm* — Morgan, Lewis & Bockius LLP

(57) ABSTRACT

Embodiments of this application disclose a data processing method performed by an electronic device. The method includes: acquiring client account data of a target client in an account data storage client and acquiring a storage key corresponding to the client account data, the target client being a user-authorized client; encrypting the client account data based on the storage key to obtain encrypted client account data; storing the encrypted client account data and transmitting the encrypted client account data to a storage server, wherein the storage server stores the encrypted client account data; and restoring the client account data based on the stored encrypted client account data and outputting the client account data in a client interface of the account data storage client in response to an output instruction, the output instruction being an output instruction for the client account data acquired in the account data storage client.

17 Claims, 12 Drawing Sheets

(51) Int. Cl.
*G06F 21/45* (2013.01)
*H04L 9/08* (2006.01)

(56) References Cited

U.S. PATENT DOCUMENTS

| | | | | |
|---|---|---|---|---|
| 10,211,991 | B1 * | 2/2019 | Aplemakh | G06F 8/61 |
| 10,410,015 | B2 | 9/2019 | Scheiblauer et al. | |
| 11,477,014 | B1 * | 10/2022 | Frasco | H04L 9/0662 |
| 2009/0187991 | A1 * | 7/2009 | Freericks | G06F 21/57 |
| | | | | 726/24 |
| 2015/0149772 | A1 * | 5/2015 | Leavy | H04L 63/06 |
| | | | | 713/168 |
| 2015/0256617 | A1 * | 9/2015 | Klose | G06F 16/972 |
| | | | | 709/217 |
| 2019/0163878 | A1 * | 5/2019 | Dowdy | G06F 21/1011 |
| 2020/0137096 | A1 * | 4/2020 | Endler | H04L 63/083 |
| 2022/0229939 | A1 * | 7/2022 | Saka | H04L 9/0891 |

FOREIGN PATENT DOCUMENTS

| | | |
|---|---|---|
| CN | 104581214 A | 4/2015 |
| CN | 111193695 A | 5/2020 |

OTHER PUBLICATIONS

Hussein et al., "Mobile applications dynamic content management server (CMS)," The Third International Conference on e-Technologies and Networks for Development (ICeND2014) Year: 2014 | Conference Paper | Publisher: IEEE.*

Tencent Technology, WO, PCT/CN2021/106606, Dec. 21, 2021, 4 pgs.

Tencent Technology, IPRP, PCT/CN2021/106606, Nov. 21, 2023, 5 pgs.

Tencent Technology, ISR, PCT/CN2021/106606, Dec. 21, 2021, 2 pgs.

* cited by examiner

DATA PROCESSING METHOD AND APPARATUS, ELECTRONIC DEVICE, AND MEDIUM

CROSS-REFERENCE TO RELATED APPLICATIONS

This application is a continuation application of PCT Patent Application No. PCT/CN2021/106606, entitled "DATA PROCESSING METHOD AND APPARATUS, ELECTRONIC DEVICE, AND MEDIUM" filed on Jul. 15, 2021, which claims priority to Chinese Patent Application No. 202110621841.4, entitled "DATA PROCESSING METHOD AND APPARATUS, ELECTRONIC DEVICE, AND MEDIUM" and filed on Jun. 3, 2021, all of which is incorporated herein by reference in its entirety.

FIELD OF THE TECHNOLOGY

This application relates to the field of cloud technologies, and in particular, to a data processing method and apparatus, an electronic device, and a medium.

BACKGROUND OF THE DISCLOSURE

At present, as users need to remember more client account data, the demand for unified storage of a plurality of pieces of client account data is increasing. In the related art, a method for storing client account data is usually manually adding data and uploading the data to a remote server for storage. However, during data transmission, data leakage is easily caused if it is intercepted by hackers, which brings risk and loss to users. Therefore, how to improve the security of data storage in the process of storing client account data has become an urgent problem to be resolved.

SUMMARY

Embodiments of this application provide a data processing method and apparatus, an electronic device, and a medium, which can improve the security of data storage.

According to an aspect, an embodiment of this application provides a data processing method, and the method includes:
  acquiring client account data of a target client in an account data storage client and acquiring a storage key corresponding to the client account data, the target client being a user-authorized client;
  encrypting the client account data based on the storage key to obtain encrypted client account data and storing the encrypted client account data and transmitting the encrypted client account data to a storage server, wherein the storage server stores the encrypted client account data; and
  restoring the client account data based on the stored encrypted client account data and outputting the client account data in a client interface of the account data storage client in response to an output instruction, the output instruction being an output instruction for the client account data acquired in the account data storage client.

According to an aspect, an embodiment of this application provides a data processing apparatus, and the apparatus includes:
  an acquisition module, configured to acquire client account data of a target client in an account data storage client and acquire a storage key corresponding to the client account data, the target client being a user-authorized client;
  an encryption module, configured to encrypt the client account data based on the storage key to obtain encrypted client account data and store the encrypted client account data and transmitting the encrypted client account data to a storage server, wherein the storage server stores the encrypted client account data; and
  an output module, configured to restore the client account data based on the stored encrypted client account data and output the client account data in a client interface of the account data storage client in response to an output instruction, the output instruction being an output instruction for the client account data acquired in the account data storage client.

According to an aspect, an embodiment of this application provides an electronic device, including a processor and a memory, the memory being configured to store program instructions, and the processor being configured to invoke the program instructions and cause the electronic device to perform some or all steps in the method described above.

According to an aspect, an embodiment of this application provides a non-transitory computer-readable storage medium, storing program instructions, the program instructions, when executed by a processor of an electronic device, causing the electronic device to perform some or all steps in the method described above.

Correspondingly, according to an aspect of this application, a computer program product or a computer program is provided, the computer program product or the computer program including program instructions, and the program instructions being stored in a computer-readable storage medium. A processor of a computer device reads the program instructions from the computer-readable storage medium, and executes the program instructions, to cause the computer device to perform the data processing method provided above.

In the embodiments of this application, client account data of a target client may be acquired in an account data storage client, and a storage key corresponding to the client account data is acquired. The client account data is encrypted based on the storage key to obtain encrypted client account data, and the encrypted client account data is stored, thereby improving the security of data storage. When an output instruction for the client account data is acquired in the account data storage client, the client account data is restored based on the stored encrypted client account data and outputted in a client interface of the account data storage client. By implementing the method provided above, when authorized client account data is acquired, the data can be encrypted and stored in the account data storage client by using the storage key. Through the encrypted and stored data, the client account data can be restored and outputted more securely, which can improve the security of data storage.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art

DESCRIPTION OF EMBODIMENTS

The following clearly and completely describes technical solutions in embodiments of this application with reference to the accompanying drawings in the embodiments of this application.

A data processing method provided in the embodiments of this application may be implemented in an electronic device, and the electronic device may be a server or a terminal device. The server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal device may be a smartphone, a tablet computer, a notebook computer, a desktop computer, a smart speaker, a smart watch, or the like, but is not limited thereto.

The embodiments of this application may relate to the field of cloud technologies. Cloud security is a collective name of security software, hardware, users, institutions, and security cloud platforms that are applied based on a cloud computing business mode. The cloud security integrates emerging technologies and concepts such as parallel processing, grid computing, and unknown virus behavior determination. Through the abnormality monitoring of a large quantity of mesh clients on software behaviors in a network, latest information of Trojan horses and malicious programs on the Internet is obtained and transmitted to a server for automatic analysis and processing, and then solutions of viruses and Trojan horses are distributed to each client. The security of data storage can be realized by performing technical solutions of this application and by using cloud security services.

Figure 1:
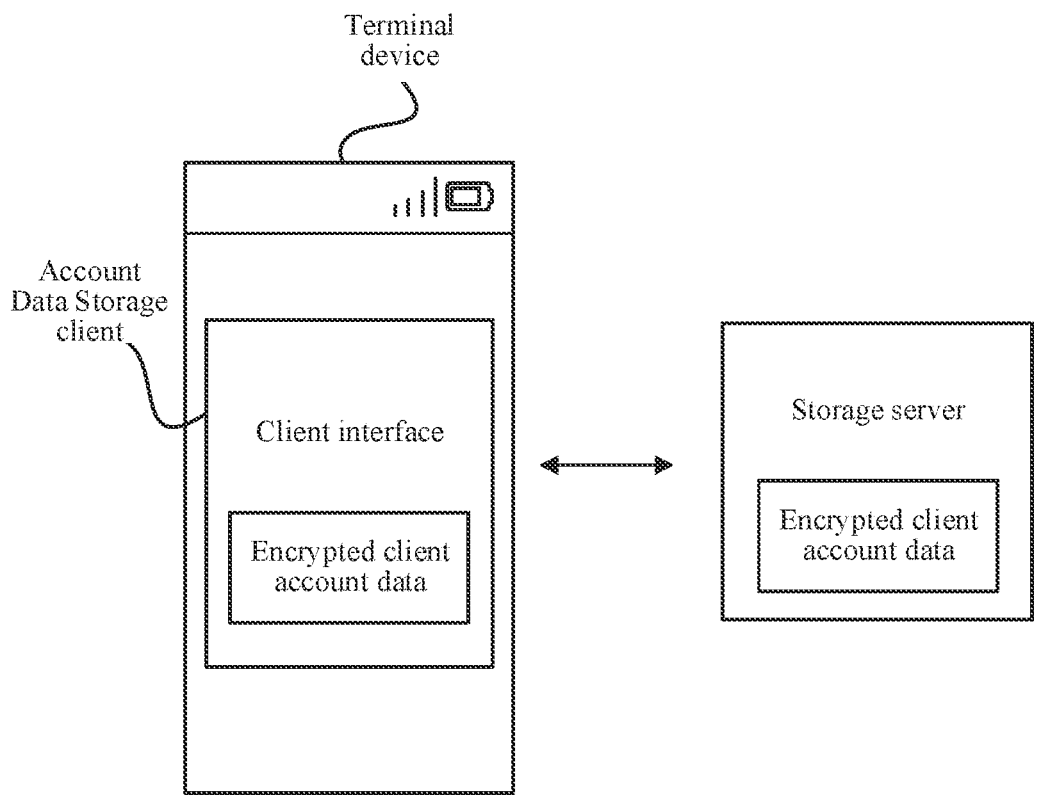
FIG. 1 is a schematic diagram of an application architecture according to an embodiment of this application.

FIG. 1 is a schematic diagram of an application architecture according to an embodiment of this application. A data processing method provided in this application may be performed through the application architecture. As shown in FIG. 1, an electronic device (herein, the electronic device is a terminal device for example) and a storage server may be included. The terminal device may acquire client account data of an authorized client (web client or application client) by performing the technical solutions of this application, and encrypt the client account data, and the terminal device stores encrypted client account data through an account data storage client and the storage server, thereby improving the security of data storage. When the client account data needs to be viewed in the account data storage client, the terminal device may acquire the encrypted client account data from the account data storage client or the storage server and restore and output the client account data in the account data storage client based on the encrypted client account data. In some embodiments, the storage server may be an independent physical server, or may be a server cluster including a plurality of physical servers or a distributed system or may be a cloud server.

Figure 2:
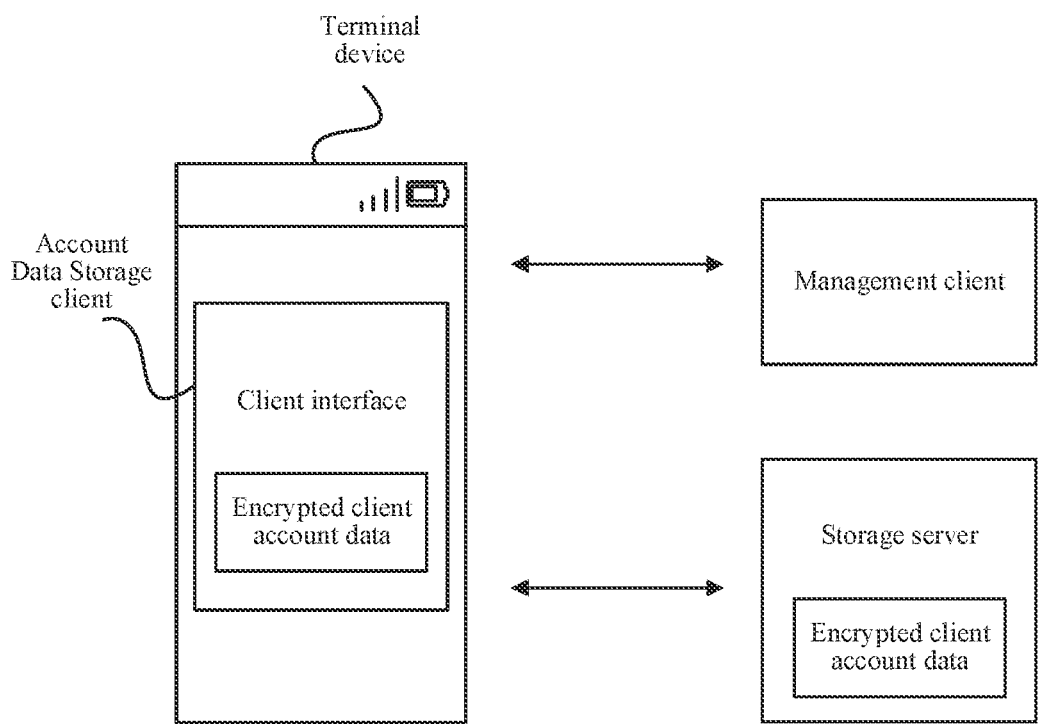
FIG. 2 is a schematic diagram of an application architecture according to an embodiment of this application.

In a possible implementation, FIG. 2 is a schematic diagram of an application architecture according to an embodiment of this application. Based on FIG. 1, an account data storage management client may further be included. Before installing the account data storage client, the terminal device needs to transmit a client download request for the account data storage client to the account data storage management client. After verifying user identity information of a target user carried in the client download request, the account data storage management client transmits an account data storage client installation data packet and a client login password to the terminal device. The terminal device may install and log in to the account data storage client based on the account data storage client installation data packet and the client login password, thereby acquiring or restoring and outputting the client account data in the logged-in account data storage client.

It may be understood that FIG. 1 and FIG. 2 are only illustrative representations of the application architecture provided in the embodiments of this application, and do not limit the architecture of the technical solutions of this application, that is, the technical solutions of this application may further provide other forms of application architectures. For ease of description, unless otherwise specified, the data processing method mentioned later is described by using the application architecture shown in FIG. 2 as an example.

In some embodiments, the electronic device may perform the data processing method according to actual service requirements to improve the security of data storage. For example, the technical solutions of this application may be applied to a scenario of unified storage of client account data of a plurality of clients. The electronic device may encrypt client account data of a plurality of authorized clients through the technical solutions of this application and store the client account data in an account data storage client or a storage server. When receiving an output instruction, the electronic device may restore and output the client account data of the plurality of authorized clients in the account data storage client based on the encrypted client account data.

In some embodiments, the data involved in this application, for example, the encrypted client account data and the user identity information of the target user, may be stored in a database or in a blockchain, for example, stored through a blockchain distributed system, which is not limited in this application. For example, the storage server may be a node in a blockchain.

The blockchain is a new application mode of computer technologies such as distributed data storage, point-to-point transmission, a consensus mechanism, and an encryption algorithm. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain may include an underlying blockchain platform, a platform product service layer, and an application service layer.

The underlying blockchain platform may include user management, basic service, smart contract, operation monitoring, and other processing modules. A user management module is responsible for management of identity information of all blockchain participants, including maintenance of public and private key generation (account management), key management, maintenance of a correspondence between a real identity of a user and a blockchain address (authority management), and so on, and in a case of being authorized, supervises and audits transaction states of some real identities, and provides rule configuration for risk control (risk control audit). A basic service module is deployed on all blockchain node devices to verify validity of a service request and records a valid request to a storage after completing consensus. For a new service request, a basic service first performs interface adaptation parsing and authentication processing (interface adaptation), then encrypts service information through a consensus algorithm (consensus management), completely and consistently transmits the new service request to a shared ledger (network communication) after encryption, and records and stores the new service request. A smart contract module is responsible for registration and issuance of a contract, as well as contract triggering and contract execution. A developer may define contract logic through a programming language, publish the contract logic to the blockchain (contract registration), according to logic of a contract term, call a key or other events to trigger execution, complete the contract logic, and further provide functions of contract upgrade and cancellation. An operation monitoring module is mainly responsible for deployment, configuration modification, contract configuration, cloud adaptation and visual output of a real-time state of a product during product operation, for example: alarming, monitoring a network condition, monitoring node device health state, and so on.

The platform product service layer provides basic capabilities and an implementation framework of a typical application. Based on these basic capabilities, developers may superpose characteristics of services and complete blockchain implementation of service logic. The application service layer provides a blockchain solution-based application service for use by a service participant. For example, in this application, a data storage function may be provided through the blockchain, and stored data, for example, the encrypted client account data may be provided to the target user.

It may be understood that the foregoing scenarios are only for example, and do not constitute a limitation to application scenarios of the technical solutions provided in the embodiments of this application, and the technical solutions of this application may also be applied to other scenarios. For example, a person of ordinary skill in the art may know that as a system architecture evolves and a new service scenario emerges, the technical solutions provided in the embodiments of this application are also applicable to a similar technical problem.

Figure 3:
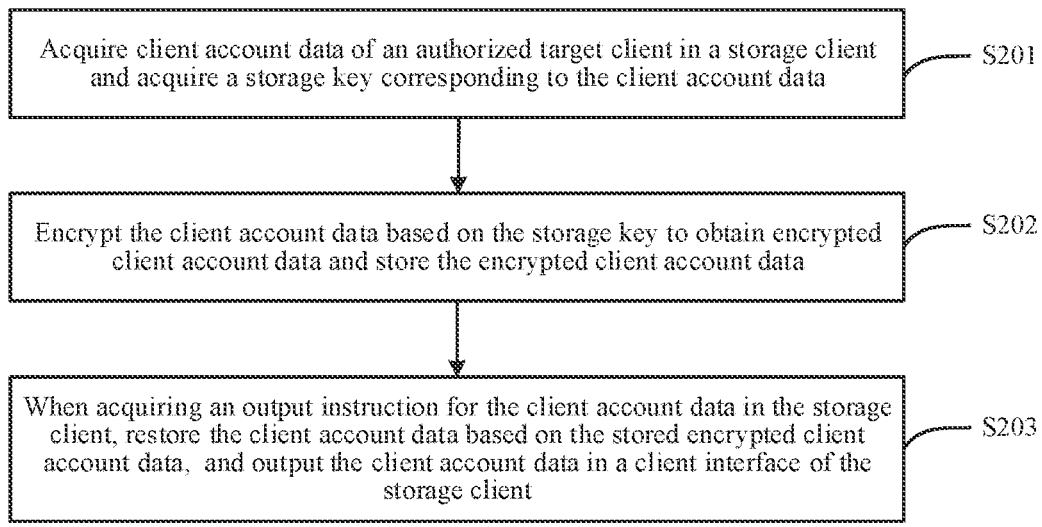
FIG. 3 is a schematic flowchart of a data processing method according to an embodiment of this application.

Based on the foregoing description, the embodiments of this application provide a data processing method, and the method may be performed by the electronic device mentioned above. Herein, an example in which the electronic device is a terminal device is used for description. FIG. 3 is a schematic flowchart of a data processing method according to an embodiment of this application. As shown in FIG. 3, a procedure of the data processing method of this embodiment of this application may include the following steps:

S201. Acquire client account data of a target client in an account data storage client and acquire a storage key corresponding to the client account data, the target client being a user-authorized client.

The target client may be a web client or an application client installed in a terminal device, and the client account data may include information for logging in to the target client, such as a username and a password. In addition, one or more target clients may be provided, and correspondingly, one or more pieces of client account data may be acquired. A data processing process and principle of the client account data are the same for each target client. Herein, an example in which one target client and one piece of corresponding client account data are provided is used for description.

The account data storage client is configured to store the client account data and may also be referred to as a token client. The token client may be an application (APP) installed in the terminal device.

In a possible implementation, an exemplary implementation in which a terminal device determines a target client is: A client authorization list is outputted according to a client authorization operation in the account data storage client, where the client authorization list includes M candidate clients, and M is a positive integer, and one or more user-selected candidate clients among the M candidate clients are determined as the target clients according to a user selection operation. The selection operation may be a click operation, a long pressing operation, a sliding operation, or a voice indication operation for a to-be-authorized client in the client authorization list. The selection operation for the M candidate clients may be determining one target client or a plurality of target clients by one selection operation, such as a batch selection operation for the M candidate clients. After detecting the selection operation for the to-be-authorized client, the terminal device determines the to-be-authorized client as an authorized target client, and after authorized, the terminal device has a permission to access the target client at any time through the account data storage client. Based on the permission, the terminal device may acquire the historical account data of the target client or account data modified from the historical account data in the account data storage client and use the historical account data or the modified account data as the client account data.

Figure 4:
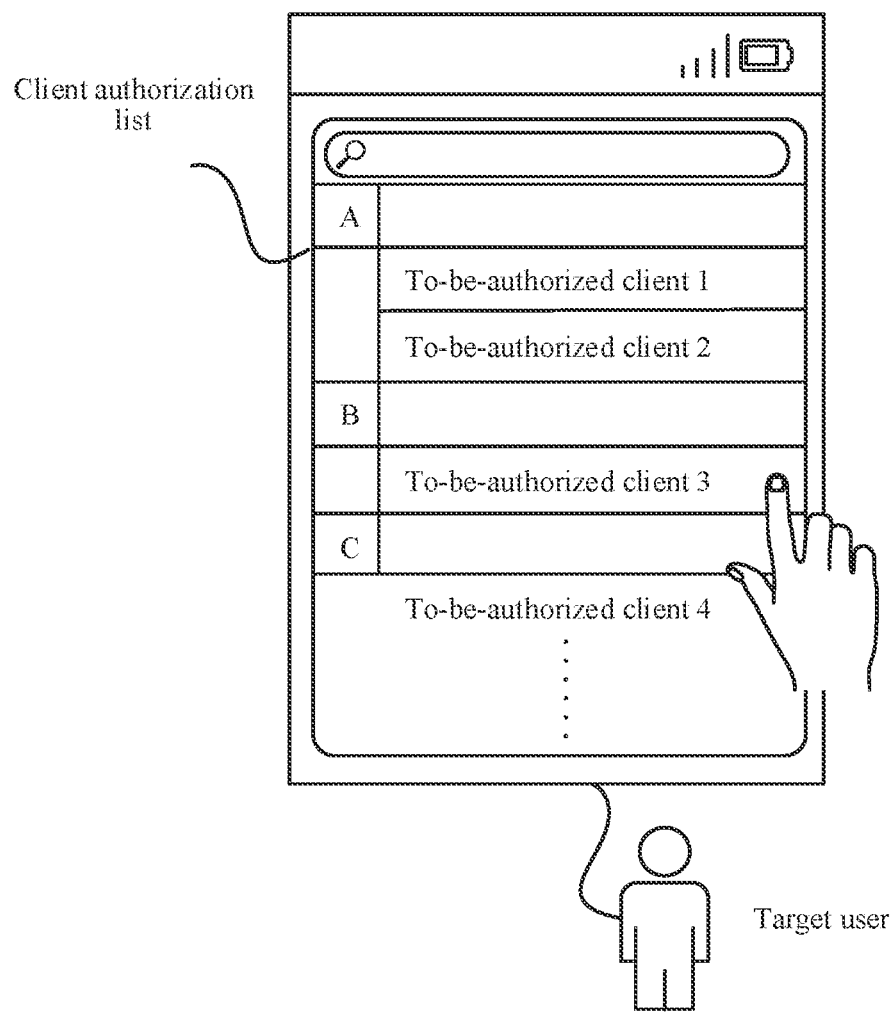
FIG. 4 is a schematic diagram of a scenario for determining a target client according to an embodiment of this application.

For example, FIG. 4 is a schematic diagram of a scenario for determining a target client according to an embodiment of this application. The terminal device outputs a client authorization list in the account data storage client according to a client authorization operation in the account data storage client. The client authorization list has a plurality of candidate clients (for example, client 1, client 2, client 3, client 4 . . . ). The target user may search for a client name through a search bar or quickly retrieve a corresponding candidate client through the initial letter of the client name, and the terminal device may determine a user-selected candidate client as the target client (for example, client 3 in FIG. 4) according to a selection operation in the client authorization list, and may acquire the client account data of the target client in the account data storage client after authorized.

Figure 5:
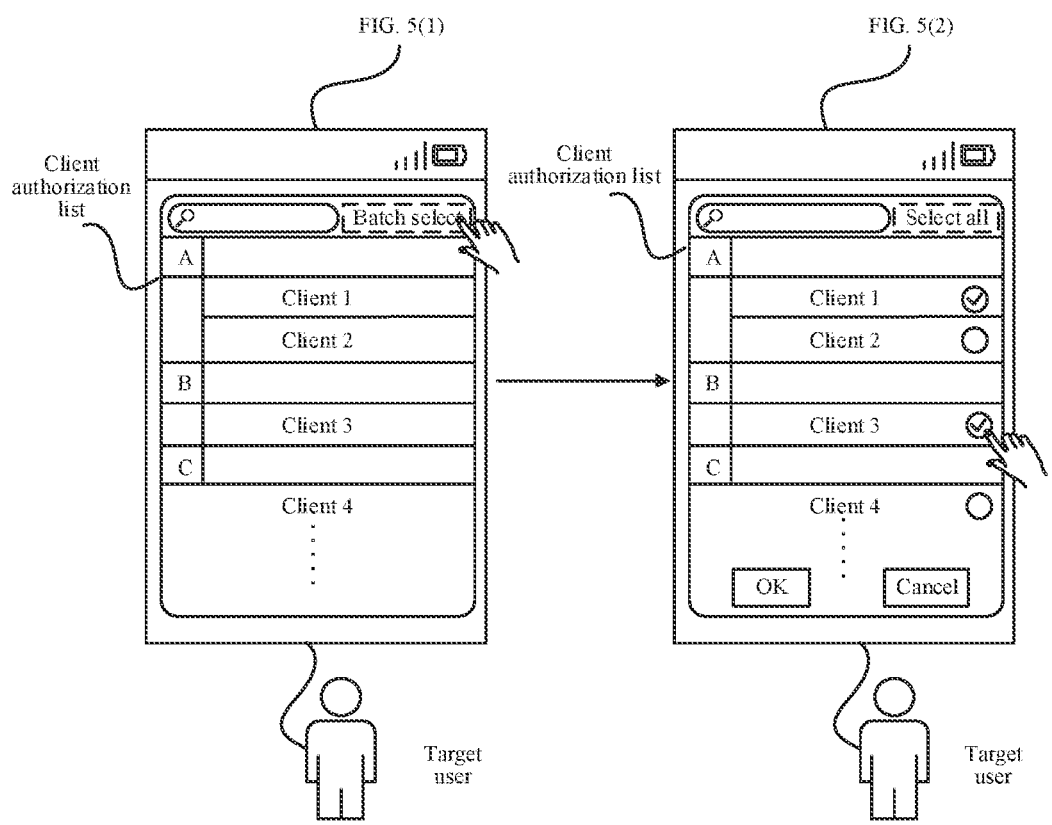
FIG. 5 is a schematic diagram of a scenario for determining a target client according to an embodiment of this application.

In another example, FIG. 5 is a schematic diagram of a scenario for determining a target client according to an embodiment of this application. The terminal device outputs a client authorization list in the account data storage client according to a client authorization operation in the account data storage client. The client authorization list has a plurality of candidate clients (for example, client 1, client 2, client 3, client 4 . . . ). The target user may determine a plurality of target clients by triggering a batch selection control. That is, in FIG. 5(1), after it is detected that the batch selection control is triggered, a circular icon corresponding to each to-be-authorized candidate client may be viewed in the client authorization list, a batch selection may be performed through a selection operation in the circular icon, and a select all operation of the to-be-authorized candidate client may be realized by triggering a select all control. In FIG. 5(2), after circular icons corresponding to client 1 and client 3 are selected, the circular icons have icons for indicating checked. After clicking an OK control, the terminal device determines the user-selected candidate clients as the target clients (that is, client 1, client 3 . . . as shown in FIG. 5(2)).

In a possible implementation, the process of the terminal device acquiring a storage key corresponding to client account data may include: generating an encrypted random number for encrypting the client account data, acquiring an encrypted account key for encrypting the encrypted random number, and using the encrypted random number and the encrypted account key as the storage key.

S202. Encrypt the client account data based on the storage key to obtain encrypted client account data and store the encrypted client account data.

In a possible implementation, the process of the terminal device encrypting the client account data based on the storage key may include; encrypting the client account data based on the encrypted random number to obtain account encrypted data, encrypting the encrypted random number based on the encrypted account key to obtain random number encrypted data, and determining the account encrypted data and the random number encrypted data as encrypted client account data. Encrypting the client account data and the encrypted random number before storing can effectively improve the difficulty of decrypting the encrypted client account data, thereby improving the security. After obtaining the encrypted client account data, the terminal device stores the encrypted client account data in the account data storage client in the terminal device, thereby acquiring the stored encrypted data in the account data storage client and restoring and outputting the encrypted data.

Figure 6:
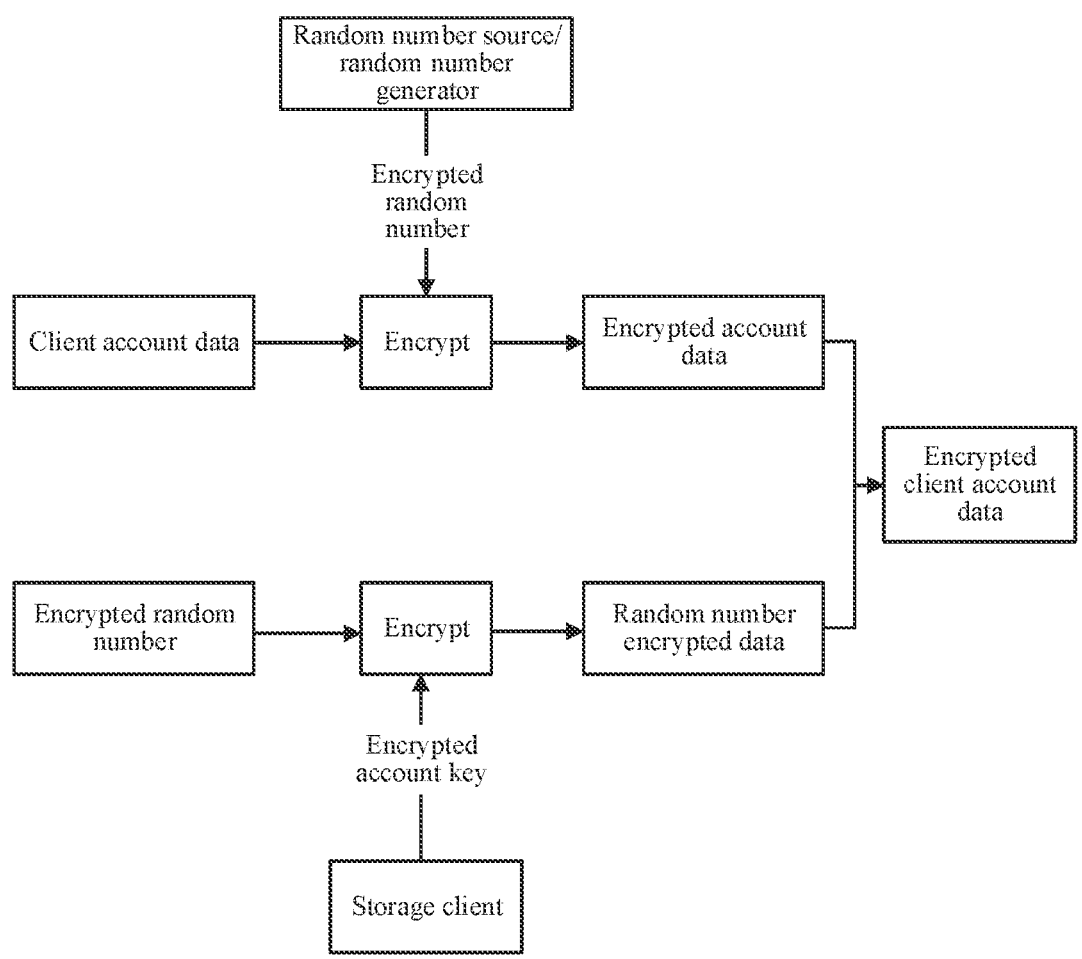
FIG. 6 is a schematic diagram of a scenario of encrypted data according to an embodiment of this application.

For example, FIG. 6 is a schematic diagram of a scenario of encrypted data according to an embodiment of this application. When acquiring the client account data of the target client in the account data storage client, the electronic device obtains the encrypted random number by using a random number source or a random number generator, and encrypts the client account data based on the encrypted random number to obtain encrypted account data. Then, the electronic device encrypts the encrypted random number based on a pre-selected and encapsulated encrypted account key in the account data storage client to obtain random number encrypted data, and obtains encrypted client account data according to the encrypted account data and the random number encrypted data.

S203. When acquiring an output instruction for the client account data in the account data storage client, restore the client account data based on the stored encrypted client account data and output the client account data in a client interface of the account data storage client.

That is, step S203 is performed in response to an output instruction. The output instruction is an output instruction for client account data acquired in the account data storage client.

In a possible implementation, an exemplary implementation in which the terminal device acquires an output instruction for client account data in an account data storage client may be: A client authorized list is outputted according to an account data viewing operation in the account data storage client, where the client authorized list includes N authorized clients, and N is a positive integer. When a selection operation for a target client in the N authorized clients is detected, the output instruction for the client account data is acquired in the account data storage client. Then, the client account data corresponding to the selected target client is outputted in the client interface of the account data storage client. The selection operation may be a click operation, a long pressing operation, a sliding operation, or a voice indication operation for the target client in the client authorized list.

Figure 7:
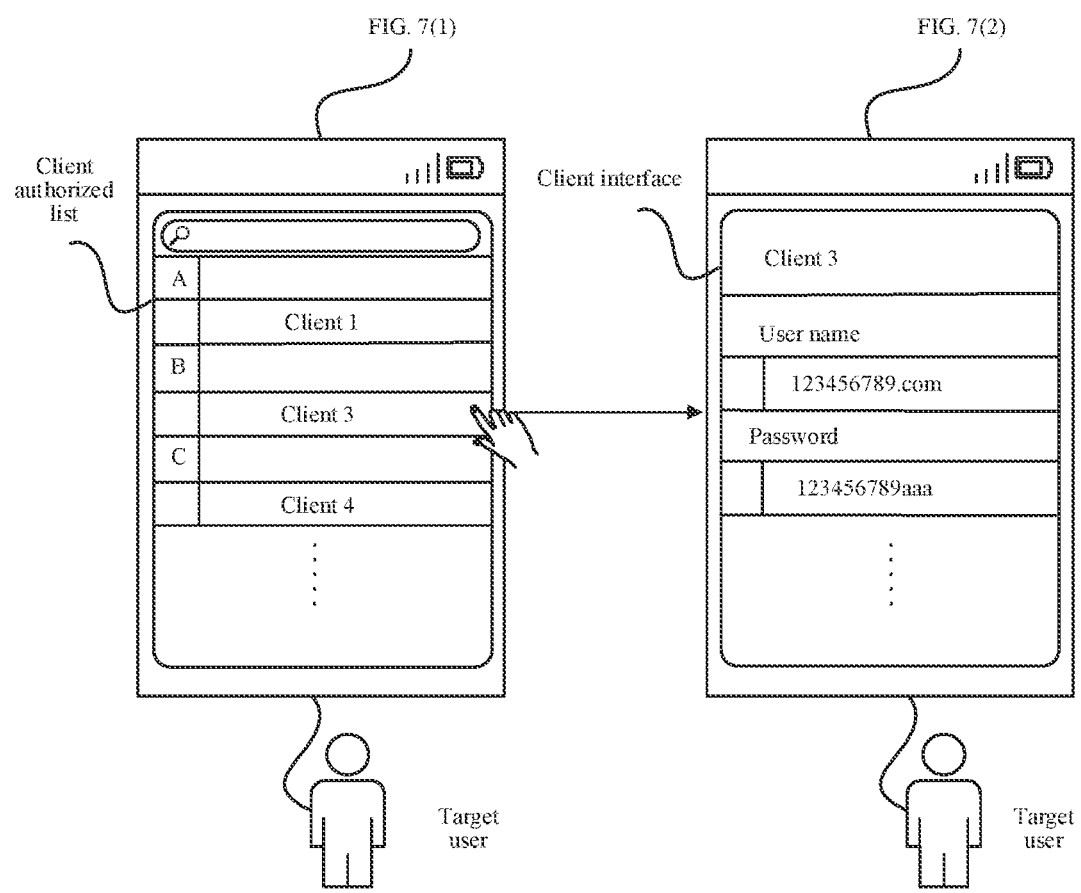
FIG. 7 is a schematic diagram of a scenario for outputting client account data according to an embodiment of this application.

For example, FIG. 7 is a schematic diagram of a scenario for outputting client account data according to an embodiment of this application. The terminal device outputs a client authorized list in the account data storage client according to an account data viewing operation in the account data storage client, and the client authorized list has a plurality of authorized clients (for example, client 1, client 3, . . . ). Client account data of each authorized client is stored in the account data storage client. The target user may search for a client name through a search bar or quickly retrieve a corresponding authorized client through the initial letter of the client name (for example, initial letter A, B, . . . in FIG. 7), and the terminal device may pop up a client account data detail page (that is, the client interface) of the target client according to a selection operation (as shown in FIG. 7(1)) for the target client (for example, client 3) in the client authorized list, that is, after acquiring the output instruction for the client account data. Detailed client account data (for example, a username, a password, private relative information, and a homepage address of the target client) may be viewed in the detail page, that is, the client account data may be restored, outputted and viewed in the client interface of the account data storage client based on the encrypted client account data (as shown in FIG. 7(2)).

Figure 8:
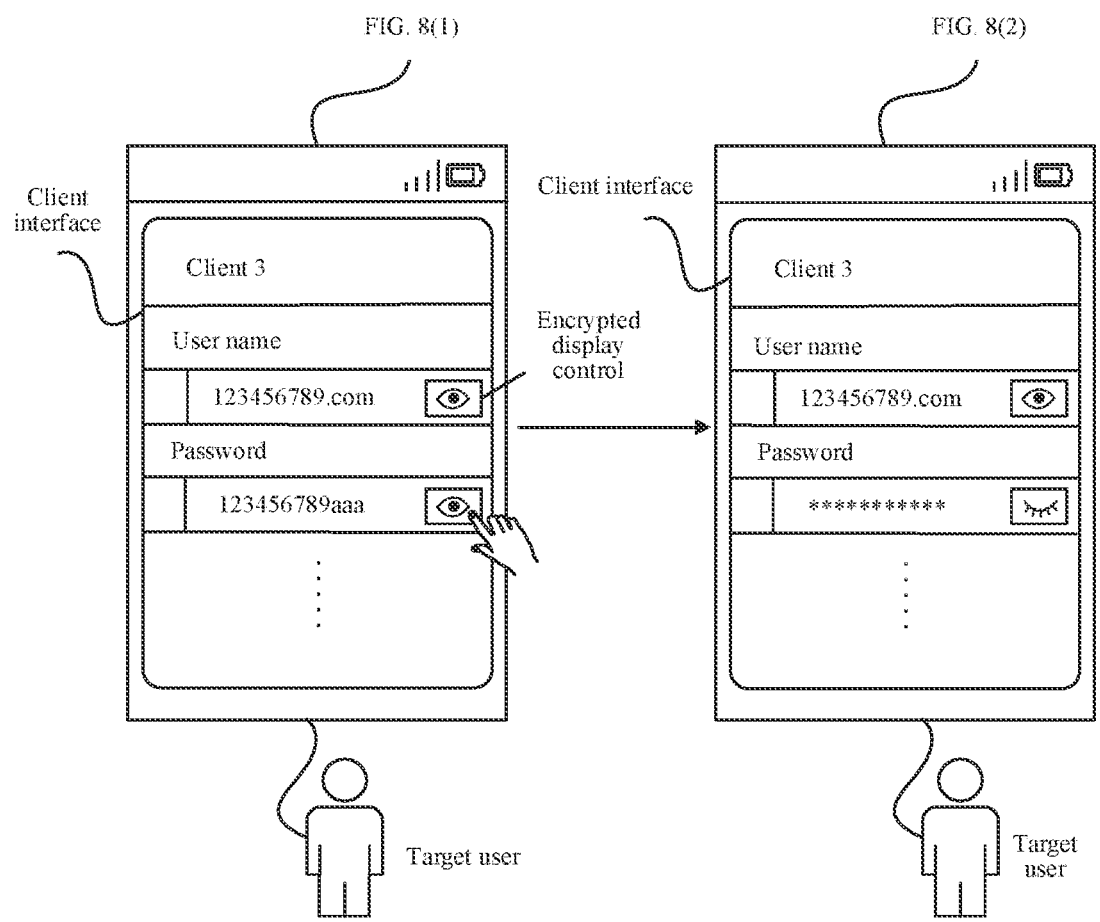
FIG. 8 is a schematic diagram of a scenario for outputting client account data according to an embodiment of this application.

In another example, FIG. 8 is a schematic diagram of a scenario for outputting client account data according to an embodiment of this application. During viewing of the client account data, an encrypted display control is set at a data display place (as shown in FIG. 8(1)), and the target user may trigger the encrypted display control so that the client account data is not directly displayed in plaintext (as shown in FIG. 8(2)), so as to prevent the client account data on the client interface from being viewed by another user after directly displayed.

As shown in FIG. 8, an encrypted display control may be set separately for each item in the client account data (for example, a username and a password in FIG. 8). The target user may control the encrypted display control corresponding to each item separately, so that each item is displayed in a plaintext or ciphertext form. As shown in FIG. 8(2), the username is displayed in the plaintext form, and the password is displayed in the ciphertext form.

In a possible implementation, the process of the terminal device restoring the client account data based on the stored encrypted client account data, and outputting the client account data in the client interface of the account data storage client may include: acquiring the stored encrypted client account data in the account data storage client, using a decrypted account key corresponding to the encrypted account key to decrypt the random number encrypted data included in the encrypted client account data to obtain an encrypted random number, decrypting the account encrypted data included in the encrypted client account data based on the encrypted random number obtained by decryption to obtain the client account data, and outputting the client account data obtained by decryption in the client interface. The encrypted account data and the decrypted account data may be the same or different.

In the embodiments of this application, client account data of a target client may be acquired in an account data storage client, and a storage key corresponding to the client account data is acquired. The client account data is encrypted based on the storage key to obtain encrypted client account data, and the encrypted client account data is stored, thereby improving the security of data storage. When an output instruction for the client account data is acquired in the account data storage client, the client account data is restored based on the stored encrypted client account data and outputted in a client interface of the account data storage client. By implementing the method provided in the embodiments of this application, when authorized client account data is acquired, the data can be encrypted and stored in the account data storage client by using the storage key. Through the encrypted stored data, the client account data can be restored and outputted more securely, which can improve the security of data storage.

Figure 9:
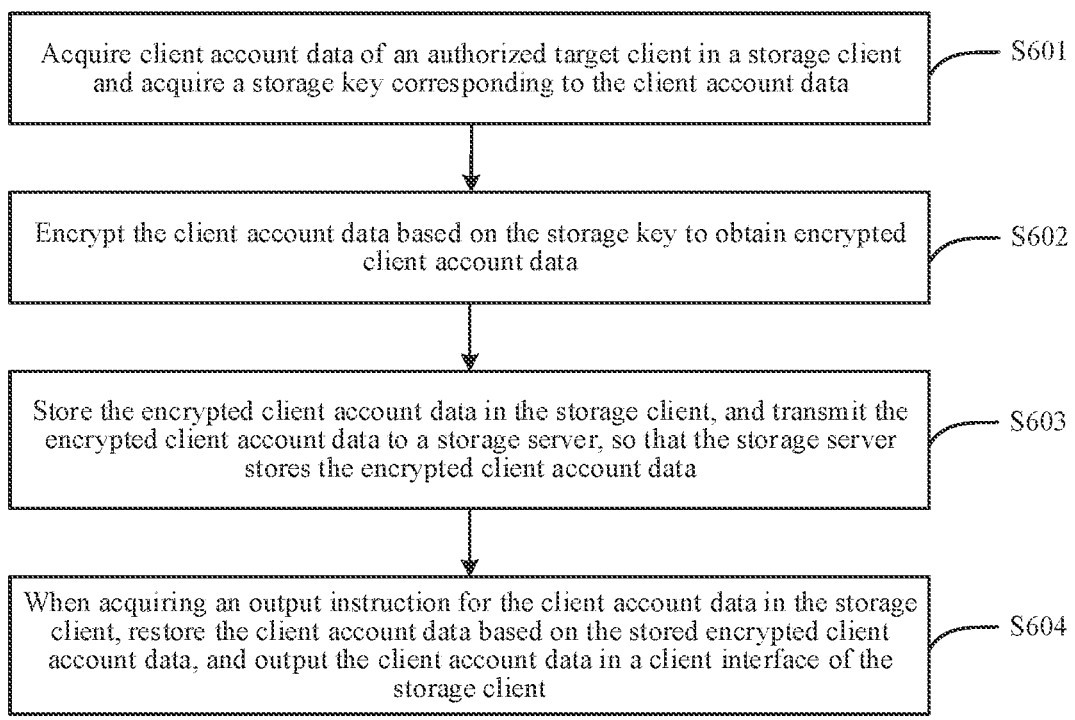
FIG. 9 is a schematic flowchart of a data processing method according to an embodiment of this application.

FIG. 9 is a schematic flowchart of a data processing method according to an embodiment of this application. The method may be performed by the electronic device mentioned above. Herein, an example in which the electronic device is a terminal device is used for description. As shown in FIG. 9, a procedure of the data processing method in this embodiment of this application may include the following steps:

S601. Acquire client account data of a target client in an account data storage client and acquire a storage key corresponding to the client account data, the target client being a user-authorized client.

For an implementation of determining the target client, reference may be made to the related descriptions of the foregoing step S201, and details are not described herein again.

In a possible implementation, an exemplary implementation in which the terminal device acquires client account data of the target client in the account data storage client may be: existing historical account data in the target client is acquired based on the account data storage client, and the historical account data is used as the client account data; or when a modification operation for the historical account data is detected in the account data storage client, account data modified from the historical account data is determined as the client account data. That is, after the account data storage client is authorized to access the target client at any time, the terminal device may acquire the historical account data in the target client through the account data storage client and encrypt or store the historical account data as the client account data. If it is detected in the account data storage client that the historical account data is modified, the modified historical account data is acquired and encrypted or stored as the client account data; and if the modified historical account data is stored as the client account data, the encrypted client account data obtained based on the historical account data is previously stored. That is, the terminal device uses the latest account data as the client account data.

In a possible implementation, a storage key for performing data encryption may include an encrypted random number and an encrypted account key, so that the process of the terminal device acquiring a storage key corresponding to the client account data may include: generating an encrypted random number for the client account data and acquiring an encrypted account key generated based on the client account data; and determining the encrypted random number and the encrypted account key as the storage key. It may be understood that the encrypted account key is a key generated based on the client account data and specific to a target user. For example, the encrypted account key may be generated based on a username in the client account data or may be generated based on a username in an account data storage client for encrypting or storing the client account data. Each time the same or different client account data is encrypted based on the storage key of the target user, the encrypted account key may be the same or different. For example, the same encrypted account key may be used during encryption of client account data of all authorized target clients, or different target clients may use different encrypted account keys during encryption of client account data of all authorized target clients. The encrypted random number may be generated by using a random number source or a random number generator, and a new encrypted random number is generated each time the client account data is encrypted, that is, the encrypted random number varies each time the client account data is encrypted. The target user is a user to which the terminal device belongs.

In a possible implementation, before acquiring the client account data of the target client in the account data storage client, the terminal device needs to install and log in to the account data storage client, so that an implementation may be: The terminal device transmits a client download request of the target user for the account data storage client to an account data storage management client, where the client download request includes user identity information of the target user. The terminal device acquires a client installation data packet and a client login password of the account data storage client transmitted by the account data storage management client, where the user identity information is encapsulated in the client installation data packet, and the user identity information has a mapping relationship with the client login password. Because the client login password may be generated based on the user identity information (for example, a valid identity document in the user identity information), the client login password has a mapping relationship with the user identity information of the target user. Then, the terminal device may install the account data storage client based on the client installation data packet and log in to the account data storage client based on the client login password. After logging in to the account data storage client, the terminal device may modify the client login password, and acquire the client account data in the logged-in account data storage client. The account data storage management client may be a web client or an application client, the client download request may further include a storage space required for the target user, and the user identity information includes a name, contact information, a valid identity document, and the like of the target user. In some embodiments, in addition to through a client login password, the terminal device may log in to the account data storage client through third-party authentication (for example, using another client), or through face recognition of the target user.

In some embodiments, before logging in to the account data storage client based on the client login password, the terminal device may detect whether the user identity information encapsulated in the installed account data storage client has a mapping relationship with the client login password; and log in to the account data storage client based on the client login password in response to the user identity information encapsulated in the installed account data storage client having a mapping relationship with the client login password. If there is no mapping relationship, the foregoing login action is not performed.

In some embodiments, after a manager of the account data storage management client verifies the user identity information of the target user successfully, a management server corresponding to the account data storage management client performs an initialization operation on the account data storage client, and an exemplary implementation may be:

(1) The management server creates a username for the target user in the storage server, generates a corresponding client login password, allocates a storage space with a specified size for the target user in the storage server based on an indication of the client download request, and sets an access permission of the storage space to allow only the target user to read and write.

(2) The management server generates an encrypted account key and a decrypted account key corresponding to the target user based on the user identity information, and encapsulates the encrypted account key, the decrypted account key, a network address of the storage server, and the user name of the target user in the storage server in the client installation data packet of the account data storage client, so that the terminal device may directly acquire required information in the account data storage client installed based on the client installation data packet.

(3) The management server further sets a recovery password (for example, a valid identity document) for restoring the storage server and an acquisition password for acquiring data from the storage server. Only after the acquisition password is verified successfully, the terminal device can acquire the client account data from the storage server and transmit the recovery password and the acquisition password to the terminal device.

(4) The management server further creates a user record of the target user in a user information database, where the user record records the user identity information of the target user and a recovery file of the account data storage client, and the recovery file includes a username in the storage server, a network address in which the target user stores the client account data in the storage server, the encrypted account key, and the decrypted account key. After the data in the account data storage client is lost or a data file in the account data storage client is damaged or the account data storage client needs to be reinstalled and the client installation data packet is lost, the terminal device may restore the account data storage client in the management server through the recovery password, that is, after the account data storage management client verifies that the recovery password is correct, the management server queries the user information database for related information of the target user, and recovers the data of the account data storage client or returns the client installation data packet again based on the related information obtained by query. It may be understood that the management server may manage the storage server, that is, the management server may create a storage space only readable by the specified user in the storage server and acquire or back up the data in the storage server.

In some embodiments, the terminal device first downloads and installs an account data storage client on which an initialization operation is to be performed, and then transmits an application request carrying the user identity information of the target user to the account data storage management client through the account data storage client. After the account data storage management client receives and verifies the user identity information, the management server creates a username in the storage server, generates an encrypted account key and a decrypted account key, and transmits a network address of the storage server, the encrypted account key, the decrypted account key, and the username to the account data storage client, and the terminal device may set a client login password in the account data storage client.

S602. Encrypt the client account data based on the storage key to obtain encrypted client account data.

In a possible implementation, for an exemplary implementation of encrypting the client account data based on the storage key, reference may be made to the related description of the foregoing step S202, and details are not described herein again.

In some embodiments, an encryption mode for the client account data may be symmetrically encrypting the client account data based on the encrypted random number, for example, by using a symmetric encryption algorithm, such as a data encryption standard (DES), an advanced encryption standard (AES), a triple data encryption algorithm (3DES), and using the encrypted random number as a symmetric encryption key to encrypt the client account data, that is, using the encrypted random number (also referred to as a key) as a parameter to be inputted into an encryption algorithm that converts plaintext into ciphertext, so that the client account data (plaintext) is encrypted to obtain account encrypted data (ciphertext). Correspondingly, during encryption of the account encrypted data, the encrypted random number used in the encryption is used as the parameter to decrypt the account encrypted data (ciphertext) to obtain the client account data (plaintext).

In some embodiments, an encryption mode for the encrypted random number may be symmetrically encrypting or asymmetrically encrypting the encrypted random number based on the encrypted account key. If the encryption mode is symmetric encryption, the encryption mode for the encrypted random number may be encrypting the client account data (but the symmetric encryption algorithm used may vary). Correspondingly, when the random number encrypted data is decrypted to obtain the encrypted random number, a decrypted account key corresponding to the encrypted account key may be used for decryption. In this case, the encrypted account key is the same as the decrypted account key. If the encryption mode is asymmetric encryption, the encrypted random number may be encrypted by using an asymmetric encryption algorithm (for example, an elliptic curve cryptography (ECC), a digital signature algorithm (DSA)) and the encrypted account key is used as an asymmetric encryption key to encrypt the encrypted random number to obtain random number encrypted data. Correspondingly, during decryption, the decrypted account key used is different from the encrypted account key.

S603. Store the encrypted client account data in the account data storage client and transmit the encrypted client account data to a storage server, so that the storage server stores the encrypted client account data.

In a possible implementation, after logging in to the account data storage client, the terminal device uses the network address of the storage server encapsulated in the account data storage client to establish a connection relationship with the storage server, and may upload, download, or delete the encrypted client account data based on the connection relationship.

The process of establishing the connection relationship is as follows: A connection request carrying the username of the target user and the acquisition password is transmitted to the storage server based on the network address. After verifying the username and the corresponding acquisition password successfully, the storage server returns connection response information. When the terminal device receives the connection response information, it indicates that the connection relationship is successfully established, and then the storage space on the storage server is mapped into a virtual partition on the terminal device. The virtual partition is a disk for storing data on a remote server virtualized by the terminal device. Like a local disk, the terminal device may read data on the virtual partition through the account data storage client and may view a storage space occupation of the virtual partition.

The terminal device reading data from the storage space (a virtual partition) of the storage server through the account data storage client may be implemented based on a network protocol. The network protocol may be a common Internet file system (CIFS) protocol. The protocol may provide the account data storage client with a service of accessing the storage space on the storage server and receiving required data returned by the storage server, or the network protocol may be a hypertext transfer protocol (HTTP), or the network protocol may be a transmission control protocol (TCP). The protocol implements data transmission in a bytecode mode, which can improve the data transmission efficiency and reduce the time for the terminal device to acquire the encrypted client account data from the storage server.

Based on this, after storing the encrypted client account data through the account data storage client, the terminal device transmits the encrypted client account data to the storage server based on the connection relationship and by using a CIFS protocol, and the storage server stores the encrypted client account data in a storage space previously created for the target user. If the client account data is modified account data, storing the encrypted client account data obtained based on the modified account data means replacing the encrypted client account data obtained based on the historical account data with the encrypted client account data obtained based on the modified account data.

In some embodiments, the management server may periodically back up the data in the storage server. If a tape library backup apparatus is used for backup or the data is transmitted to a third-party cloud storage server for backup, the operation cost of the server can be reduced. When the data in the account data storage client and the data in the storage server are deleted, the terminal device may restore the data in the account data storage client and the storage server through the management server. Further, in some embodiments, the account data storage management client may use monthly payment or other methods to charge the target user according to the size of the storage space allocated for the target user and stop use functions of the account data storage client and the storage server of the terminal device when the target user pays the fee.

S604. When acquiring an output instruction for the client account data in the account data storage client, restore the client account data based on the stored encrypted client account data, and output the client account data in a client interface of the account data storage client.

In a possible implementation, when acquiring the output instruction, the terminal device restores and outputs the client account data in the client interface based on the encrypted client account data stored in the account data storage client. Alternatively, when acquiring the output instruction and failing to acquire the encrypted client account data from the account data storage client (for example, the encrypted client account data stored in the account data storage client is deleted), the terminal device acquires the encrypted client account data from the storage server based on the connection relationship and the acquisition password, and restores and outputs the client account data in the client interface based on the encrypted client account data acquired from the storage server.

An exemplary implementation in which the terminal device restores and outputs the client account data in the client interface based on the encrypted client account data acquired from the storage server may be: First, data received from the storage server is verified by using a digital signature, where the data signature is used for verifying the integrity of the received data and the identity of a data transmitter to ensure the security of the received data. After the verification is successful, the received encrypted client account data is decrypted and outputted by using a corresponding decrypted account key and encrypted random number.

In addition, during use of the account data storage client, the account data storage client runs all the time in a background mode, so that the connection relationship between the terminal device and the storage server is maintained all the time. After detecting that the account data storage client exits (the process of the account data storage client is shut down), the terminal device is disconnected from the storage server and the virtual partition also disappears from the terminal device.

Figure 10:
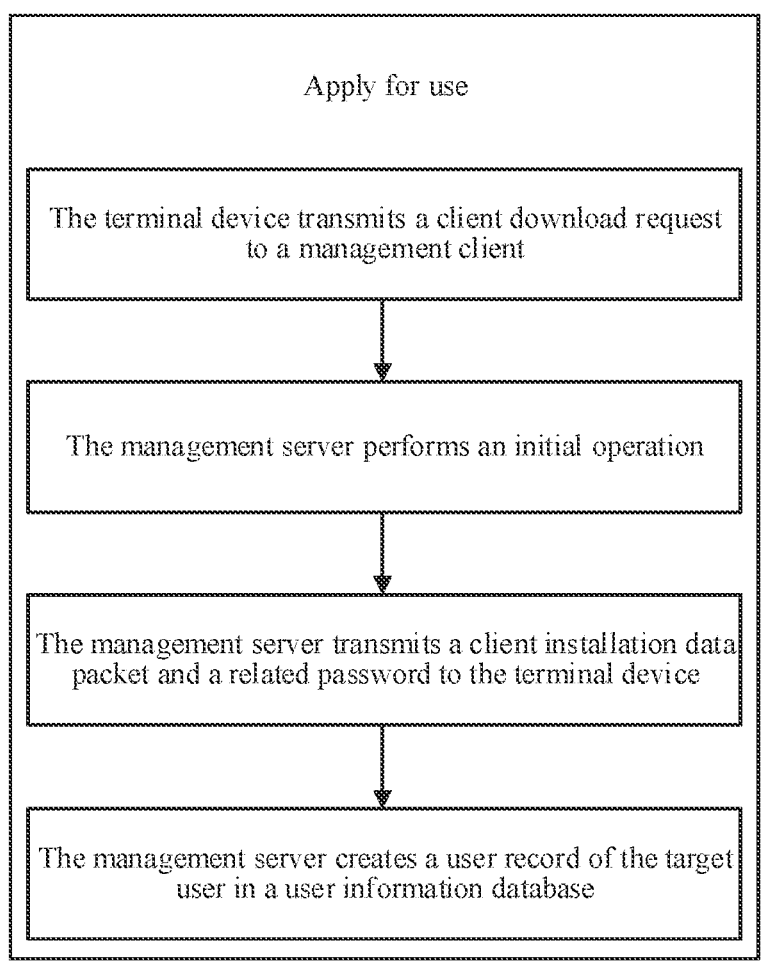
FIG. 10 is a schematic diagram of a scenario for data processing according to an embodiment of this application.
Figure 11:
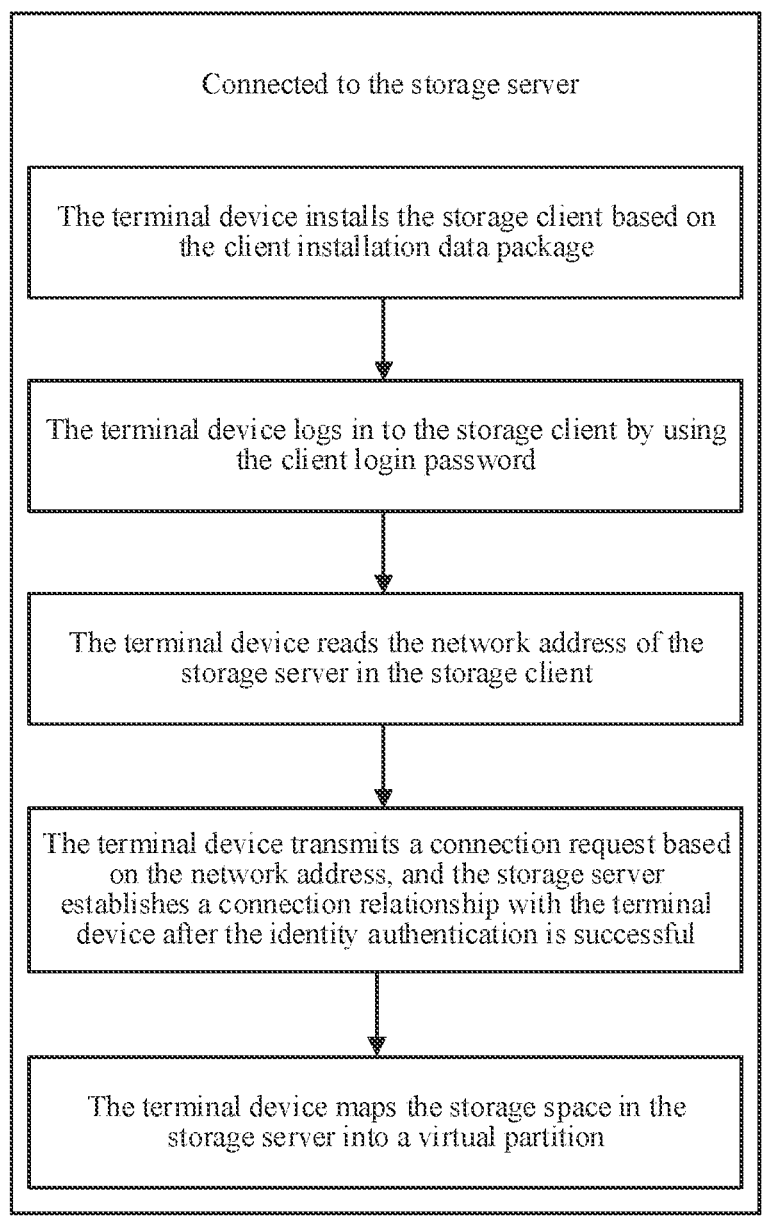
FIG. 11 is a schematic diagram of a scenario for data processing according to an embodiment of this application.
Figure 12:
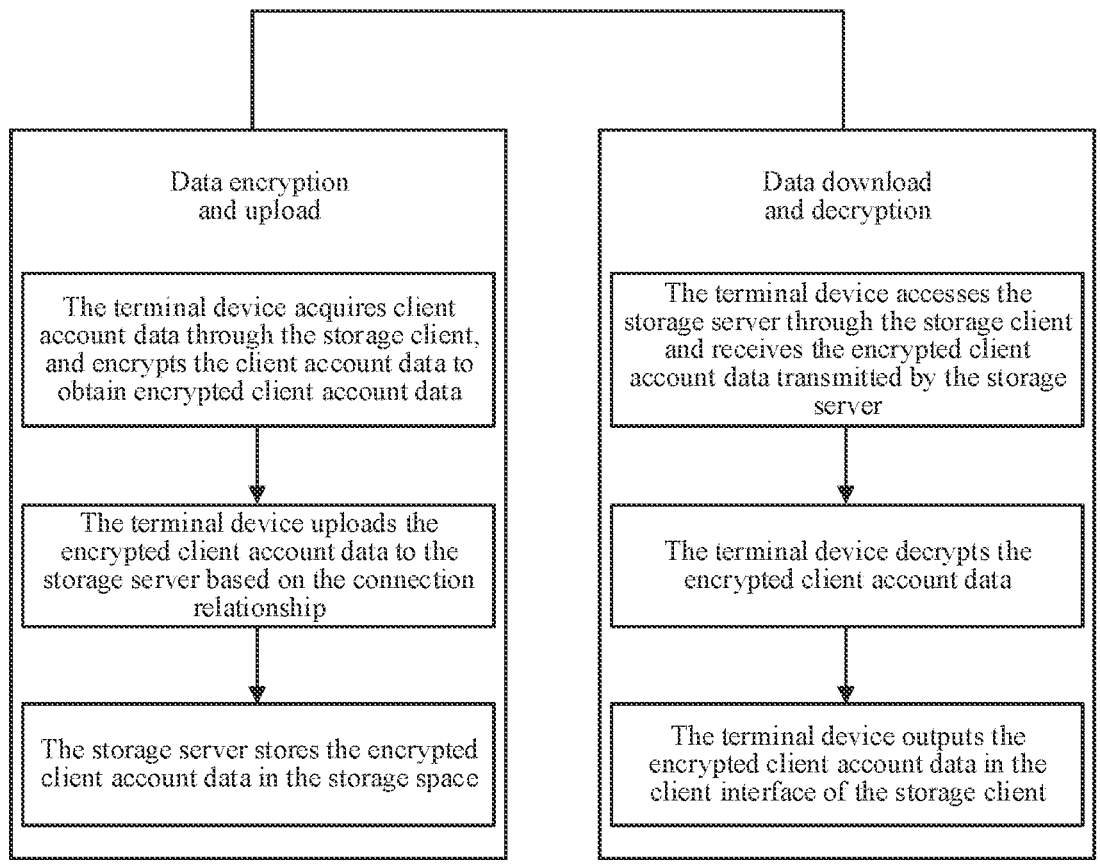
FIG. 12 is a schematic diagram of a scenario for data processing according to an embodiment of this application.
Figure 13:
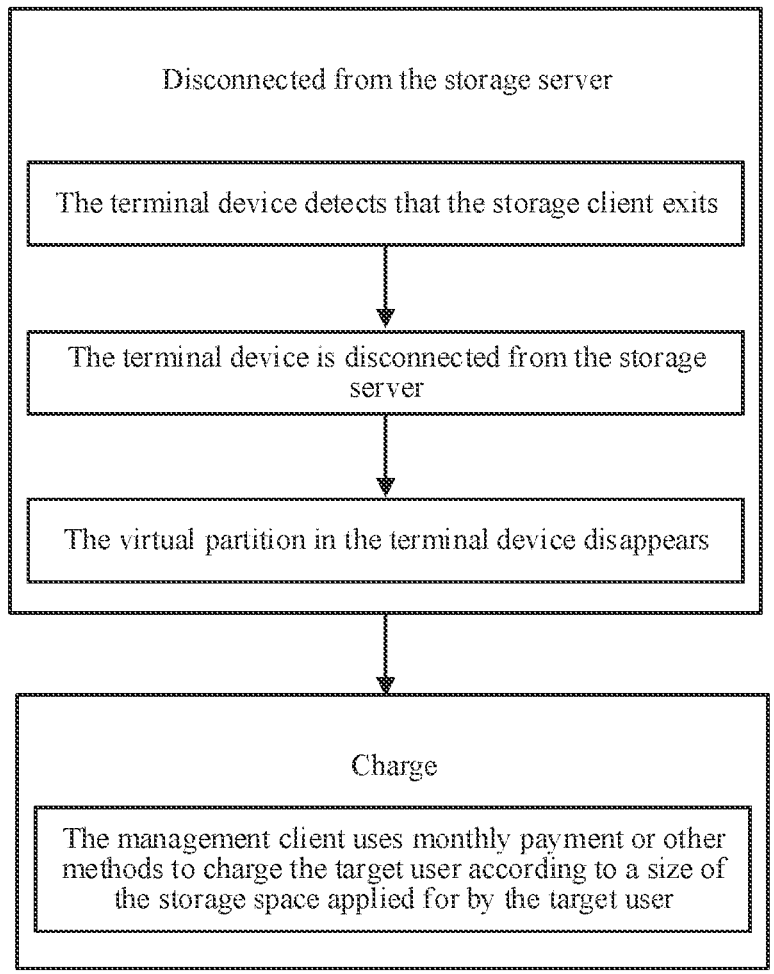
FIG. 13 is a schematic diagram of a scenario for data processing according to an embodiment of this application.

For example, FIG. 10 to FIG. 13 are schematic diagrams of a scenario for data processing according to embodiments of this application. In FIG. 10, the terminal device transmits a client download request of a target user for an account data storage client to an account data storage management client, to apply to the account data storage management client for using the account data storage client. After the verification is successful, the management server performs an initialization operation, that is, creates a username and a storage space, generates a related key (an encrypted account key and a decrypted account key), and a related password (a client login password, an acquisition password, and a recovery password), encapsulates related information (a network address of the storage server, a user, and a related key) in a client installation data packet, transmits the client installation data packet and the related password to the terminal device, and creates a user record of the target user in a user information database. In FIG. 11, the terminal device is connected to the storage server, that is, the terminal device installs the account data storage client based on the client installation data packet, logs in to the account data storage client by using the client login password, and reads the network address of the storage server in the account data storage client, the terminal device transmits a connection request based on the network address, the storage server establishes a connection relationship with the terminal device after the identity authentication is successful, and the terminal device maps the storage space in the storage server into a virtual partition. In FIG. 12, (1) Data encryption and upload, that is, the terminal device acquires client account data through the account data storage client and encrypts the client account data to obtain encrypted client account data, and the terminal device uploads the encrypted client account data to the storage server based on the connection relationship, and the storage server stores the data in the storage space. (2) Data download and decryption, that is, the terminal device accesses the storage server through the account data storage client, and receives the encrypted client account data transmitted by the storage server, and the terminal device decrypts the encrypted client account data, and outputs the client account data obtained by decryption in the client interface of the account data storage client. In FIG. 13, (1) Disconnect a connection relationship with the storage server, that is, after detecting that the account data storage client exits, the terminal device disconnects the connection relationship with the storage server, and the virtual partition in the terminal device disappears; (2) Charge, that is, the account data storage management client uses monthly payment or other methods to charge the target user according to a size of the storage space applied for by the target user.

In the embodiments of this application, client account data of a target client may be acquired in an account data storage client, and a storage key corresponding to the client account data is acquired. The client account data is encrypted based on the storage key to obtain encrypted client account data, the encrypted client account data is stored in the account data storage client, and the encrypted client account data is transmitted to a storage server, so that the storage server stores the encrypted client account data. When an output instruction for the client account data is acquired in the account data storage client, the client account data is restored based on the stored encrypted client account data and outputted in a client interface of the account data storage client. By implementing the method provided in the embodiments of this application, when the client account data is acquired, the storage key is used in the account data storage client to encrypt and store the data, so that the data cannot be acquired even if it is intercepted during data transmission, thereby reducing the risk of data leakage and improving the security of data storage. Through the encrypted and stored data, the client account data can be restored and outputted more securely, and the data is backed up. Even if the data of the account data storage client is deleted or damaged, the data in the account data storage client can be restored to ensure that no important data is lost, and the secure storage of client account data of a plurality of clients can be implemented through the account data storage client and the storage server, thereby improving the user experience and convenience.

Figure 14:
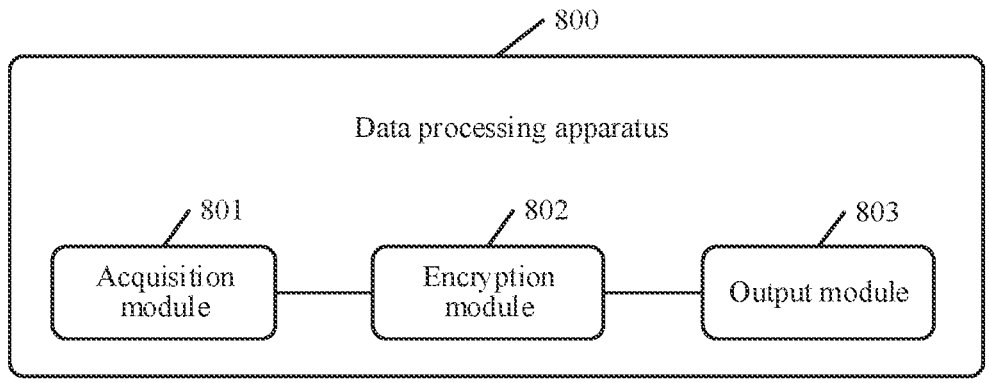
FIG. 14 is a schematic structural diagram of a data processing apparatus according to an embodiment of this application.

FIG. 14 is a schematic structural diagram of a data processing apparatus according to an embodiment of this application. The data processing apparatus shown in FIG. 14 is configured to perform the methods in the embodiments shown in FIG. 3 and FIG. 9 of this application. For ease of description, only a part related to this embodiment of this application is shown. For technical details that are not disclosed, refer to the embodiments shown in FIG. 3 and FIG. 9 of this application. The data processing apparatus 800 may include: an acquisition module 801, an encryption module 802, and an output module 803.

The acquisition module 801 is configured to acquire client account data of a target client in an account data storage client and acquire a storage key corresponding to the client account data, the target client being a user-authorized client.

The encryption module 802 is configured to encrypt the client account data based on the storage key to obtain encrypted client account data and store the encrypted client account data.

The output module 803 is configured to restore the client account data based on the stored encrypted client account data and output the client account data in a client interface of the account data storage client in response to an output instruction, the output instruction being an output instruction for the client account data acquired in the account data storage client.

In a possible implementation, when configured to acquire a storage key corresponding to the client account data, the acquisition module 801 is configured to:
  generate an encrypted random number for the client account data and acquire an encrypted account key generated based on the client account data; and
  determine the encrypted random number and the encrypted account key as the storage key.

When configured to encrypt the client account data based on the storage key to obtain encrypted client account data, the encryption module 802 is configured to:
  encrypt the client account data based on the encrypted random number to obtain account encrypted data,
  encrypt the encrypted random number based on the encrypted account key to obtain random number encrypted data; and
  determine the account encrypted data and the random number encrypted data as the encrypted client account data.

In a possible implementation, when configured to restore the client account data based on the stored encrypted client account data and output the client account data in a client interface of the account data storage client in response to an output instruction, the output module 803 is configured to:
  decrypt the random number encrypted data based on a decrypted account key corresponding to the encrypted account key in response to the output instruction, to obtain the encrypted random number;
  decrypt the account encrypted data based on the encrypted random number obtained by decryption to obtain the client account data; and
  output the client account data obtained by decryption in the client interface.

In a possible implementation, when configured to store the encrypted client account data, the encryption module 802 is configured to:
  store the encrypted client account data in the account data storage client and transmit the encrypted client account data to a storage server, so that the storage server stores the encrypted client account data.

When configured to restore the client account data based on the stored encrypted client account data and output the client account data in a client interface of the account data storage client in response to an output instruction, the output module 803 is configured to:
  restore and output the client account data in the client interface based on the encrypted client account data stored in the account data storage client in response to the output instruction; or acquire the encrypted client account data from the storage server and restore and output the client account data in the client interface based on the encrypted client account data acquired from the storage server in response to the output instruction.

In a possible implementation, the acquisition module 801 is further configured to:
- output a client authorization list according to a client authorization operation in the account data storage client, where the client authorization list includes M candidate clients, and M is a positive integer; and
- determine, among the M candidate clients, user-selected candidate clients as the target clients according to a user selection operation.

In a possible implementation, when configured to acquire client account data of a target client in an account data storage client, the acquisition module 801 is configured to:
- acquire existing historical account data in the target client based on the account data storage client, and use the historical account data as the client account data; or
- determine, in response to detecting a modification operation for the historical account data in the account data storage client, account data modified from the historical account data as the client account data.

In a possible implementation, the acquisition module 801 is further configured to:
- transmit a client download request of a target user for the account data storage client to an account data storage management client, where the client download request includes user identity information of the target user;
- acquire a client installation data packet and a client login password of the account data storage client transmitted by the account data storage management client, where the user identity information is encapsulated in the client installation data packet, and the user identity information has a mapping relationship with the client login password; and
- install the account data storage client based on the client installation data packet and log in to the account data storage client based on the client login password.

The acquiring client account data of a target client in an account data storage client includes:
- acquiring the client account data in the logged-in account data storage client.

In this embodiment of this application, the acquisition module acquires client account data of a target client in an account data storage client and acquires a storage key corresponding to the client account data. The encryption module encrypts the client account data based on the storage key to obtain encrypted client account data, and stores the encrypted client account data, thereby improving the security of data storage. When acquiring an output instruction for the client account data in the account data storage client, the output module restores the client account data based on the stored encrypted client account data and outputs the client account data in a client interface of the account data storage client. By implementing the apparatus provided above, when authorized client account data is acquired, the data can be encrypted and stored in the account data storage client by using the storage key; Through the encrypted and stored data, the client account data can be restored and outputted more securely, which can improve the security of data storage.

Functional modules in the embodiments of this application may be integrated into one module, or each of the modules may exist alone physically, or two or more modules may be integrated into one module. The integrated module may be implemented in the form of hardware (processors, circuitry, and/or memory), or implemented in the form of a software functional module stored in memory or non-transitory computer-readable medium, which is not limited in this application. Each module can be implemented using one or more processors (or processors and memory). Likewise, a processor (or processors and memory) can be used to implement one or more modules. Moreover, each module can be part of an overall module that includes the functionalities of the module.

Figure 15:
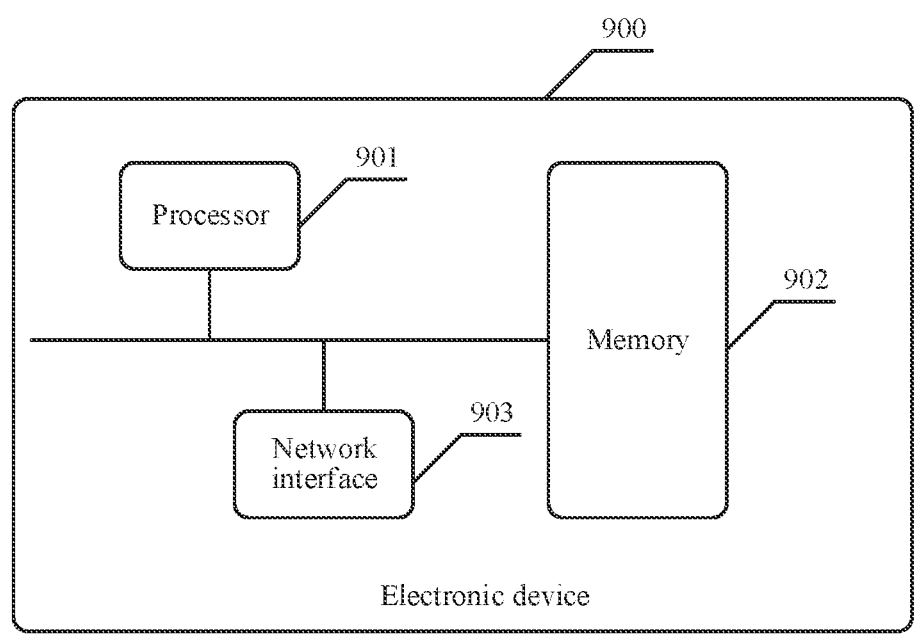
FIG. 15 is a schematic structural diagram of an electronic device according to an embodiment of this application.

FIG. 15 is a schematic structural diagram of an electronic device according to an embodiment of this application. As shown in FIG. 15, the electronic device 900 includes: at least one processor 901, and a memory 902. In some embodiments, the electronic device may further include a network interface 903. Data exchange may be performed between the processor 901, the memory 902, and the network interface 903. The network interface 903 is controlled by the processor 903 for receiving and transmitting message. The memory 902 is configured to store a computer program. The computer program includes program instructions. The processor 901 is configured to execute the program instructions stored in the memory 902. The processor 901 is configured to invoke the program instructions to perform the foregoing method.

The memory 902 may include a volatile memory, such as a random-access memory (RAM). The memory 902 may also include a non-volatile memory, such as a flash memory or a solid-state drive (SSD). The memory 902 may alternatively include a combination of the foregoing types of memories.

The processor 901 may be a central processing unit (CPU). In an embodiment, the processor 901 may alternatively be a graphics processing unit (GPU). The processor 901 may alternatively be a combination of a CPU and a GPU.

In a possible implementation, the memory 902 is configured to store program instructions. The processor 901 may invoke the program instructions to perform the following steps:
- acquiring client account data of a target client in an account data storage client and acquiring a storage key corresponding to the client account data, the target client being a user-authorized client;
- encrypting the client account data based on the storage key to obtain encrypted client account data and storing the encrypted client account data; and
- restoring the client account data based on the stored encrypted client account data and outputting the client account data in a client interface of the account data storage client in response to an output instruction.

In a possible implementation, when configured to acquire a storage key corresponding to the client account data, the processor 901 is configured to:
- generate an encrypted random number for the client account data and acquire an encrypted account key generated based on the client account data; and
- determine the encrypted random number and the encrypted account key as the storage key;

When configured to encrypt the client account data based on the storage key to obtain encrypted client account data, the processor 901 is configured to:
- encrypt the client account data based on the encrypted random number to obtain account encrypted data;
- encrypt the encrypted random number based on the encrypted account key to obtain random number encrypted data; and determine the account encrypted data and the random number encrypted data as the encrypted client account data.

In a possible implementation, when configured to restore the client account data based on the stored encrypted client account data and output the client account data in a client interface of the account data storage client in response to an output instruction, the processor 901 is configured to:

decrypt the random number encrypted data based on a decrypted account key corresponding to the encrypted account key in response to the output instruction, to obtain the encrypted random number;

decrypt the account encrypted data based on the encrypted random number obtained by decryption to obtain the client account data; and output the client account data obtained by decryption in the client interface.

In a possible implementation, when configured to store the encrypted client account data, the processor 901 is configured to:

store the encrypted client account data in the account data storage client and transmit the encrypted client account data to a storage server, so that the storage server stores the encrypted client account data.

When configured to restore the client account data based on the stored encrypted client account data and output the client account data in a client interface of the account data storage client in response to an output instruction, the processor 901 is configured to:

restore and output the client account data in the client interface based on the encrypted client account data stored in the account data storage client in response to the output instruction; or acquire the encrypted client account data from the storage server and restore and output the client account data in the client interface based on the encrypted client account data acquired from the storage server in response to the output instruction.

In a possible implementation, the processor 901 is further configured to:

output a client authorization list according to a client authorization operation in the account data storage client, where the client authorization list includes M candidate clients, and M is a positive integer; and determine, among the M candidate clients, user-selected candidate clients as the target clients according to a user selection operation.

In a possible implementation, when configured to acquire client account data of a target client in an account data storage client, the processor 901 is configured to:

acquire existing historical account data in the target client based on the account data storage client, and use the historical account data as the client account data; or determine, in response to detecting a modification operation for the historical account data in the account data storage client, account data modified from the historical account data as the client account data.

In a possible implementation, the processor 901 is further configured to:

transmit a client download request of a target user for the account data storage client to an account data storage management client, where the client download request includes user identity information of the target user;

acquire a client installation data packet and a client login password of the account data storage client transmitted by the account data storage management client, where the user identity information is encapsulated in the client installation data packet, and the user identity information has a mapping relationship with the client login password; and install the account data storage client based on the client installation data packet and log in to the account data storage client based on the client login password.

The acquiring client account data of a target client in an account data storage client includes:

acquiring the client account data in the logged-in account data storage client.

During implementation, the data processing apparatus 800, the processor 901, and the memory 902 described above may perform the implementations described in the foregoing method embodiments or may perform the implementations described in the embodiments of this application. Details are not described herein again.

An embodiment of this application further provides a computer (readable) storage medium, storing a computer program, the computer program including program instructions, the program instructions, when executed by a processor, causing the processor to perform some or all the steps performed in the foregoing method embodiments. In some embodiments, the computer storage medium may be volatile or non-volatile. The computer-readable storage medium may mainly include a program storage area and a data storage area. The program storage area may store an operating system, an application program required by at least one function, or the like, and the data storage area may store data created according to use of blockchain nodes.

"Plurality of" mentioned in the specification means two or more. "And/or" describes an association relationship between associated objects and represents that three relationships may exist. For example. A and/or B may represent the following three cases: Only A exists, both A and B exist, and only B exists. The character "/" generally indicates an "or" relationship between the associated objects.

A person skilled in the art may understand that all or some of the procedures of the methods of the foregoing embodiments may be implemented by using a computer program instructing related hardware. The program may be stored in a computer storage medium, and the computer storage medium may be a computer-readable storage medium. When the program is executed, the program may include the procedures described in the foregoing method embodiments. The storage medium may be a magnetic disk, an optical disc, a read-only memory (ROM), a RAM, or the like.

The foregoing descriptions are merely some embodiments of this application and are not intended to limit the scope of this application. A person skilled in the art may understand all or some processes of the foregoing embodiments, and equivalent modifications made according to the claims of this application shall still fall within the scope of this application.

What is claimed is:

1. A data processing method, performed by an electronic device, the method comprising:

transmitting a client download request of a target user for an account data storage client to an account data storage management client, wherein the client download request comprises user identity information of the target user;

acquiring, from the account data storage management client, a client installation data package corresponding to the account data storage client and a client login password of the account data storage client, wherein the client installation data package is generated by an account data storage management server corresponding to the account data storage management client after the account data storage management client authenticates the user identity information of the target user and the client login password of the account data storage client is encapsulated in the client installation data package; and installing the account data storage client based on the client installation data package;

extracting, from the client installation data package, the client login password;

determining that the extracted client login password encapsulated in the installed account data storage client has a mapping relationship with the user identity information of the target user;

logging into the account data storage client based on the extracted client login password;

acquiring client account data of target clients in the logged-in account data storage client and acquiring a storage key corresponding to the client account data, the target clients being user-authorized client-side applications associated with the target user and the client account data includes login information for authenticating the target user's access to the client-side applications;

encrypting the client account data based on the storage key to obtain encrypted client account data;

storing the encrypted client account data and transmitting the encrypted client account data to the account data storage management server, wherein the account data storage management server stores the encrypted client account data; and restoring the client account data based on the stored encrypted client account data and outputting the client account data in a client interface of the account data storage client in response to an output instruction by displaying the login information of the target user client-side applications associated with the target user in the client interface of the account data storage client, the output instruction being an output instruction for the client account data acquired in the account data storage client.

2. The method according to claim 1, wherein the acquiring a storage key corresponding to the client account data comprises:

generating an encrypted random number for the client account data and acquiring an encrypted account key generated based on the client account data; and determining the encrypted random number and the encrypted account key as the storage key.

3. The method according to claim 2, wherein the encrypting the client account data based on the storage key to obtain encrypted client account data comprises:

encrypting the client account data based on the encrypted random number to obtain account encrypted data;

encrypting the encrypted random number based on the encrypted account key to obtain random number encrypted data; and determining the account encrypted data and the random number encrypted data as the encrypted client account data.

4. The method according to claim 3, wherein the restoring the client account data based on the stored encrypted client account data and outputting the client account data in a client interface of the account data storage client in response to an output instruction comprises:

decrypting the random number encrypted data based on a decrypted account key corresponding to the encrypted account key in response to the output instruction, to obtain the encrypted random number;

decrypting the account encrypted data based on the encrypted random number obtained by decryption to obtain the client account data; and outputting the client account data obtained by decryption in the client interface.

5. The method according to claim 1, wherein the restoring the client account data based on the stored encrypted client account data and outputting the client account data in a client interface of the account data storage client in response to an output instruction comprises:

restoring and outputting the client account data in the client interface based on the encrypted client account data stored in the account data storage client in response to the output instruction.

6. The method according to claim 1, wherein the restoring the client account data based on the stored encrypted client account data and outputting the client account data in a client interface of the account data storage client in response to an output instruction comprises:

acquiring the encrypted client account data from the storage server; and restoring and outputting the client account data in the client interface based on the encrypted client account data acquired from the storage server in response to the output instruction.

7. The method according to claim 1, further comprising:

outputting a client authorization list according to a client authorization operation in the account data storage client, wherein the client authorization list comprises M candidate clients, and M is a positive integer; and determining, among the M candidate clients, user-selected candidate clients as the target clients according to a user selection operation.

8. The method according to claim 1, wherein the acquiring client account data of target clients in an account data storage client comprises:

acquiring existing historical account data in the target clients based on the account data storage client and using the historical account data as the client account data.

9. The method according to claim 1, wherein the acquiring client account data of target clients in an account data storage client comprises:

determining, in response to detecting a modification operation for the historical account data in the account data storage client, account data modified from the historical account data as the client account data.

10. An electronic device, comprising a processor and a memory, the memory being configured to store program instructions, and the processor being configured to invoke the program instructions, and cause the electronic device to perform a data processing method including:

transmitting a client download request of a target user for an account data storage client to an account data storage management client, wherein the client download request comprises user identity information of the target user;

acquiring, from the account data storage management client, a client installation data package corresponding to the account data storage client and a client login password of the account data storage client, wherein the client installation data package is generated by an account data storage management server corresponding to the account data storage management client after the account data storage management client authenticates the user identity information of the target user and the client login password of the account data storage client is encapsulated in the client installation data package; and installing the account data storage client based on the client installation data package;

extracting, from the client installation data package, the client login password;

determining that the extracted client login password encapsulated in the installed account data storage client has a mapping relationship with the user identity information of the target user;

logging into the account data storage client based on the extracted client login password;

acquiring client account data of target clients in the logged-in account data storage client and acquiring a storage key corresponding to the client account data, the target clients being user-authorized client-side applications associated with the target user and the client account data includes login information for authenticating the target user's access to the client-side applications;

encrypting the client account data based on the storage key to obtain encrypted client account data;

storing the encrypted client account data and transmitting the encrypted client account data to the account data storage management server, wherein the account data storage management server stores the encrypted client account data; and restoring the client account data based on the stored encrypted client account data and outputting the client account data in a client interface of the account data storage client in response to an output instruction by displaying the login information of the target user client-side applications associated with the target user in the client interface of the account data storage client, the output instruction being an output instruction for the client account data acquired in the account data storage client.

11. The electronic device according to claim 10, wherein the acquiring a storage key corresponding to the client account data comprises:

generating an encrypted random number for the client account data and acquiring an encrypted account key generated based on the client account data; and determining the encrypted random number and the encrypted account key as the storage key.

12. The electronic device according to claim 11, wherein the encrypting the client account data based on the storage key to obtain encrypted client account data comprises:

encrypting the client account data based on the encrypted random number to obtain account encrypted data;

encrypting the encrypted random number based on the encrypted account key to obtain random number encrypted data; and determining the account encrypted data and the random number encrypted data as the encrypted client account data.

13. The electronic device according to claim 12, wherein the restoring the client account data based on the stored encrypted client account data and outputting the client account data in a client interface of the account data storage client in response to an output instruction comprises:

decrypting the random number encrypted data based on a decrypted account key corresponding to the encrypted account key in response to the output instruction, to obtain the encrypted random number;

decrypting the account encrypted data based on the encrypted random number obtained by decryption to obtain the client account data; and outputting the client account data obtained by decryption in the client interface.

14. The electronic device according to claim 10, wherein the method further comprises:

outputting a client authorization list according to a client authorization operation in the account data storage client, wherein the client authorization list comprises M candidate clients, and M is a positive integer; and determining, among the M candidate clients, user-selected candidate clients as the target clients according to a user selection operation.

15. A non-transitory computer-readable storage medium, storing program instructions, the program instructions, when executed by a processor of an electronic device, causing the electronic device to perform a data processing method including:

transmitting a client download request of a target user for an account data storage client to an account data storage management client, wherein the client download request comprises user identity information of the target user;

acquiring, from the account data storage management client, a client installation data package corresponding to the account data storage client and a client login password of the account data storage client, wherein the client installation data package is generated by an account data storage management server corresponding to the account data storage management client after the account data storage management client authenticates the user identity information of the target user and the client login password of the account data storage client is encapsulated in the client installation data package; and installing the account data storage client based on the client installation data package;

extracting, from the client installation data package, the client login password;

determining that the extracted client login password encapsulated in the installed account data storage client has a mapping relationship with the user identity information of the target user;

logging into the account data storage client based on the extracted client login password;

acquiring client account data of target clients in the logged-in account data storage client and acquiring a storage key corresponding to the client account data, the target clients being user-authorized client-side applications associated with the target user and the client account data includes login information for authenticating the target user's access to the client-side applications;

encrypting the client account data based on the storage key to obtain encrypted client account data;

storing the encrypted client account data and transmitting the encrypted client account data to the account data storage management server, wherein the account data storage management server stores the encrypted client account data; and restoring the client account data based on the stored encrypted client account data and outputting the client account data in a client interface of the account data storage client in response to an output instruction by displaying the login information of the target user client-side applications associated with the target user in the client interface of the account data storage client, the output instruction being an output instruction for the client account data acquired in the account data storage client.

16. The non-transitory computer-readable storage medium according to claim 15, wherein the acquiring a storage key corresponding to the client account data comprises:
   generating an encrypted random number for the client account data and acquiring an encrypted account key generated based on the client account data; and
   determining the encrypted random number and the encrypted account key as the storage key.

17. The non-transitory computer-readable storage medium according to claim 16, wherein the encrypting the client account data based on the storage key to obtain encrypted client account data comprises:
   encrypting the client account data based on the encrypted random number to obtain account encrypted data;
   encrypting the encrypted random number based on the encrypted account key to obtain random number encrypted data; and
   determining the account encrypted data and the random number encrypted data as the encrypted client account data.

\* \* \* \* \*